(12) United States Patent
Bachelder et al.

(10) Patent No.: US 6,798,515 B1
(45) Date of Patent: Sep. 28, 2004

(54) METHOD FOR CALCULATING A SCALE RELATIONSHIP FOR AN IMAGING SYSTEM

(75) Inventors: Ivan Bachelder, Newton, MA (US); Adam Wagman, Framingham, MA (US)

(73) Assignee: Cognex Technology and Investment Corporation, Mt. View, CA (US)

(*) Notice: Subject to any disclaimer, the term of this patent is extended or adjusted under 35 U.S.C. 154(b) by 171 days.

(21) Appl. No.: 09/996,834

(22) Filed: Nov. 29, 2001

(51) Int. Cl.$^7$ .............................................. G03B 11/00
(52) U.S. Cl. .................................. 356/397; 356/388
(58) Field of Search .............................. 356/73.1, 388, 356/394, 396, 397, 625, 634, 635

(56) References Cited

U.S. PATENT DOCUMENTS

| | | |
|---|---|---|
| 5,179,419 A | 1/1993 | Palmquist et al. |
| 5,319,734 A | 6/1994 | Buzzetti |
| 5,535,002 A | 7/1996 | Csipkes et al. |
| 5,543,915 A | 8/1996 | Csipkes et al. |
| 5,596,672 A | 1/1997 | Harman et al. |
| 5,600,439 A | 2/1997 | Csipkes et al. |
| 5,636,020 A | 6/1997 | Csipkes et al. |
| 5,657,131 A | 8/1997 | Csipkes et al. |
| 5,671,049 A | 9/1997 | Csipkes et al. |
| 5,724,127 A | 3/1998 | Csipkes et al. |
| 5,727,327 A | 3/1998 | Wakabayashi et al. |
| 5,729,622 A | 3/1998 | Csipkes et al. |
| 5,729,966 A | 3/1998 | Grulick |
| 5,731,893 A | 3/1998 | Dominique |
| 5,768,401 A | 6/1998 | Csipkes et al. |
| 5,768,409 A | 6/1998 | Csipkes et al. |
| 5,809,162 A | 9/1998 | Csipkes et al. |
| 5,825,483 A | 10/1998 | Michael et al. |
| 5,857,047 A | 1/1999 | Strand et al. |
| 5,857,049 A | 1/1999 | Beranek et al. |
| 5,862,250 A | 1/1999 | Csipkes et al. |
| 5,898,494 A | 4/1999 | Csipkes et al. |
| 5,923,781 A | 7/1999 | Csipkes et al. |
| 5,995,212 A | 11/1999 | Dar et al. |
| 6,069,991 A | 5/2000 | Hibbs-Brenner et al. |
| 6,088,498 A | 7/2000 | Hibbs-Brenner et al. |
| 6,105,396 A | 8/2000 | Glodis et al. |
| 6,137,893 A | 10/2000 | Michael et al. |

OTHER PUBLICATIONS

IEC, End–face image analysis procedure for the calibration of optical fibre geometry test sets, international Standard, First Edition, 1998.

*Primary Examiner*—Rodney Fuller
(74) *Attorney, Agent, or Firm*—Tracy Calabresi

(57) ABSTRACT

The disclosed methods and apparatuses leverage a known value of a characteristic of an object to partially calibrate an imaging system "on-the-fly", and minimize, if not eliminate, the need for a separate calibration image(s). Specifically, the scale relationship (i.e. the relationship between physical dimensions and image dimensions) is calculated using the known value and a measured value of the characteristic from the image. The same image used to calculate the scale relationship is also processed, such as inspected, for example. The known value can be a measurement of an aspect of many things, including an inherent feature, or a relationship between features, for example. One embodiment uses a model to find the characteristic. A described preferred embodiment inspects an end-face of a fiber-optic cable, wherein the known value is the diameter of an annular cladding of the fiber-optic cable.

40 Claims, 13 Drawing Sheets

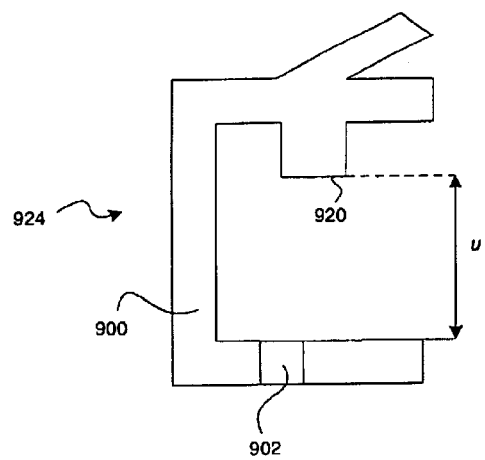
FIGURE 9
(Prior Art)
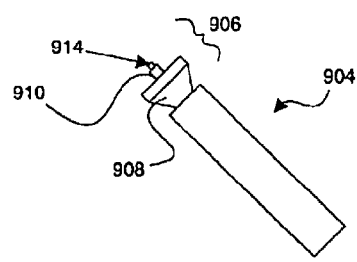
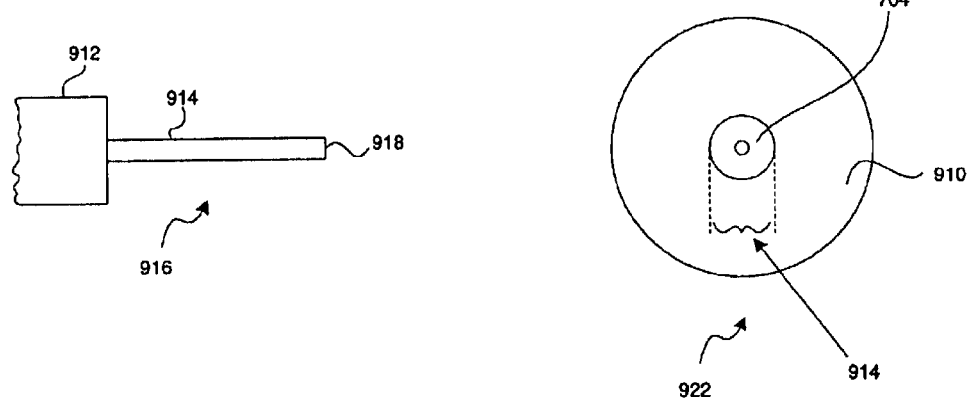
FIGURE 9a
(Prior Art)
FIGURE 9b
(Prior Art)

METHOD FOR CALCULATING A SCALE RELATIONSHIP FOR AN IMAGING SYSTEM

FIELD OF THE INVENTION

This invention relates to imaging systems, and more particularly to methods and apparatuses for calibrating an imaging system.

BACKGROUND

In imaging applications, one often wants to measure the distance between two or more points in an image and then convert the result to some physical scale. The conversion between the image distance (i.e. pixels) and the physical distance (e.g. microns) is governed by a scale relationship, where the scale relationship is typically calculated by calibrating an imaging system.

As known in the art, the imaging system typically includes an imaging element, such as a charge-coupled-device ("CCD") camera, for example, a digitizing element, such as a frame grabber or digital CCD, for example, and optionally, an external optical system, such as a microscope. As known in the art, the imaging system also includes the relationship(s) between the imaging element, the external optical system, if present, and the physical object(s) that are being imaged, i.e. the subject.

Calibration provides both the scale relationship, that relates image dimensions to physical dimensions, and positional information, that relates any point in the image to a physical-coordinate system, such as that which governs a robotic arm, for example.

FIG. 1 is an illustration of a simple calibration device 100, which can be used to provide the scale relationship, and two images 110, 114 of the calibration device. The calibration device 100 includes a rectangle 102 and two crosses 104, 106, which are positioned on opposite ends of the rectangle 102. To calibrate, at least partially, an imaging system with the calibration device 100, the distance 108, designated $d_{pu}$ (physical units) herein, is measured in physical units, such as microns or millimeters, for example. Then, the image 110 is acquired of the calibration device 100 positioned horizontally, and the distance 112, which is designated $d_x$ (pixels) herein, is measured in pixels. The horizontal resolution, designated $r_x$, is computed by dividing the distance 112 in pixels by the distance 108 in physical units, i.e. $r_x = d_x/d_{pu}$. Subsequently, the image 114 is acquired of the calibration device 100 positioned vertically, and the distance 116 in the image 114, which is designated $d_y$ (pixels) herein, is measured. The vertical resolution, designated $r_y$, is computed as $r_y = d_y/d_{pu}$. With the x and the y resolution of the imaging system, a distance between any two points in an image acquired with that imaging system could be accurately measured and expressed Where the distance in physical units, designated l, is given as:

$$l = \mathrm{sqrt}((h/r_x)^2 + (v/r_y)^2)$$

where l = the length in physical units, h and v are the horizontal and vertical distance in pixels, respectively, and $r_x$ and $r_y$ are the horizontal and vertical resolution, respectively.

The above-described calibration uses a separate calibration object 100 and calibration image(s) 110, 114 to provide the scale relationship between physical dimensions and image dimensions.

Other known calibration methods use one or more calibration images and/or object(s), where the other methods can be more complex or less complex than the above-described example.

Calibrating an imaging system can also compensate for one or more distortions. The above-described calibration removes and/or minimizes non-square pixel distortion, a term known in the art. Other more complex calibration methods, such as a grid of dots, remove and/or minimize optical distortion, for example. As known in the art, calibrating with a grid of dots is imaging a rectangular array of filled circles of known dimensions, located at predetermined points, and spaced apart at known distances. Also, the grid may, or may not, have markers that indicate the direction of the x- and y-axes and the location of the origin of the grid of dots. The imaging system is calibrated by comparing the image of the grid of dots to its known physical description.

Further, calibrating an imaging system can also provide positional information For example, positional information is determined by placing the calibration device 100 at a known physical position before acquiring the calibration images 110, 114.

Typically in industry, a system is calibrated at the beginning of a task, and the system is not re-calibrated for days and sometimes even months. If parts of the imaging system change, the scale relationship determined during calibration is not accurate for subsequent images. Consequently, any measurements of features derived from an image, such as potential defects, for example, are not reliable. Inspecting an image using an unreliable scale relationship can cause one to miss defects or erroneously classify an acceptable feature as a defect, i.e. false positives.

SUMMARY

A method is disclosed for, at least partially, calibrating an imaging system, where partially calibrating constitutes at least calculating a scale relationship between an image and the real world, such as 10 pixels equals 4 microns, for example. First, the method selects a characteristic associated with an object that has a known value. The known value of the characteristic and a measured value of the characteristic are used to calculate the scale relationship, where the measured value is derived from an image of the characteristic. The image is acquired by the imaging system that is being calibrated In the image, the characteristic is found and measured to provide the measured value. Lastly, once the scale relationship is calculated, the scale relationship is used to process the same image from which it was derived.

The invention recognizes that a known value of a characteristic of an object can be leveraged to calculate a scale relationship for an imaging system. Further, the invention recognizes that by using the known value, a single image can be processed, such as inspected for example, and used to calculate the scale relationship of the imaging system. Thus, the invention eliminates, or decreases the need for a separate calibration image(s) and/or object(s).

Several examples of characteristics are described including the value of: an inherent feature, a boundary thereof, and/or an aspect(s) thereof, such as a dimension(s), a provided feature, such as a fiducial, a boundary thereof, and/or aspect(s) thereof, or a relationship between more than one feature, such as a distance between centers of features, for instance.

In one embodiment, the imaging system is re-calibrated using more than one image of the same or multiple objects.

In a preferred embodiment, the image is inspected using the scale relationship derived therefrom. Specifically, the scale relationship, calculated from the known value and the measurement from the image, is used to calculate the physical dimensions and positions of defects located during the subsequent inspection.

In a preferred embodiment, the method is accomplished, in part, using a model of at least part of the object, where the model includes the characteristic that has the known value. For example, as hereinafter described, a model of an annular cladding of a fiber-optic end-face is created using the diameter of the annular cladding in microns, where the value of the diameter in the physical world is the known value. The model is used to find, and optionally measure, a pixel diameter of the annular cladding in the image.

The method is particularly suited for calculating a scale relationship of an image of a fiber-optic end-face acquired by an imaging system. As known in the industry, during imaging the fiber-optic end-face is not fixed in the z-plane. There is some leeway, because of the physical set-up, described hereinafter. Therefore, as recognized by the invention, without re-calibrating the imaging system, the movement of the fiber-optic end-face in the z-plane makes the scale relationship originally calculated for the imaging system unreliable. Consequently, the unreliable scale relationship will cause errors in apparent size and apparent position of the features in the fiber-optic end-face. Therefore, a fiber-optic end-face is aptly suited for processing using the invention. Specifically, a preferred embodiment selects for the characteristic a diameter of an annular cladding, which is often 125 microns, as known in the art Then, the imaging system images the fiber-optic end-face, the image analysis system finds the annular cladding, measures its diameter (i.e. the measured value), and calculates the scale relationship using the measured value and the known value (i.e. 125 microns). The scale relationship is used, thereafter, to process the image of the fiber-optic end-face, such as calculate the size of defects discovered therein during inspection, for example.

One of the advantages of the invention, among others, is that the invention can replace prior-art steps to calculate the scale relationship; a separate calibration image(s) of a calibration object(s) is not required.

Another advantage of the invention is that it can supplement, augment, or improve an imaging system's calibration, particularly when the manufacturing tolerance for at least one object in the image, which provides the known value, at is tighter than the placement tolerance of at least a part of the imaging system Another advantage of the invention is that changes in the imaging system, such as lens or camera changes, will not affect the reliability of measurements derived from images taken by the imaging system. Also, jostling of cameras or other apparatus in any given imaging system will not appreciably affect the reliability of measurements derived from images taken by the imaging system.

A further advantage of the invention is that for continuously, or predictably, changing imaging systems, such as systems wherein the objects, or portions thereof, are displaced relative to the imaging plane, the operation does not have to stop and wait for recalculation of the scale relationship of the system. Instead, the scale relationship is recalculated for the other object, or another portion of the object, during processing, i.e. "on-the-fly".

A still further advantage of the invention is that it can supplement various measurement applications that require accuracy, such as accurately measuring potential defects, for example.

A still further advantage of the invention is that objects can be provided with calibration targets, such as a grid of dots for example, used for calculating the scale relationship "on-the-fly" and/or for determining other typical calibration transforms "on-the-fly," such as positional information or distortion information, for example.

In other aspects, the invention provides an apparatus in accord with the methods described above. The aforementioned and other aspects of the invention are evident in the drawings and in the description that follows.

BRIEF DESCRIPTION OF THE DRAWINGS

The invention will be more fully understood from the following detailed description, in conjunction with the accompanying figures, wherein:

FIGS. 9, 9a, and 9bdepict an exploded side-view of an instance of a fiber-optic cable inspection station, not drawn to scale, a side-view of a stripped fiber-optic cable, not drawn to scale, and an end-view of a fiber-optic cable, not drawn to scale, respectively;

DETAILED DESCRIPTION

Figure 1:
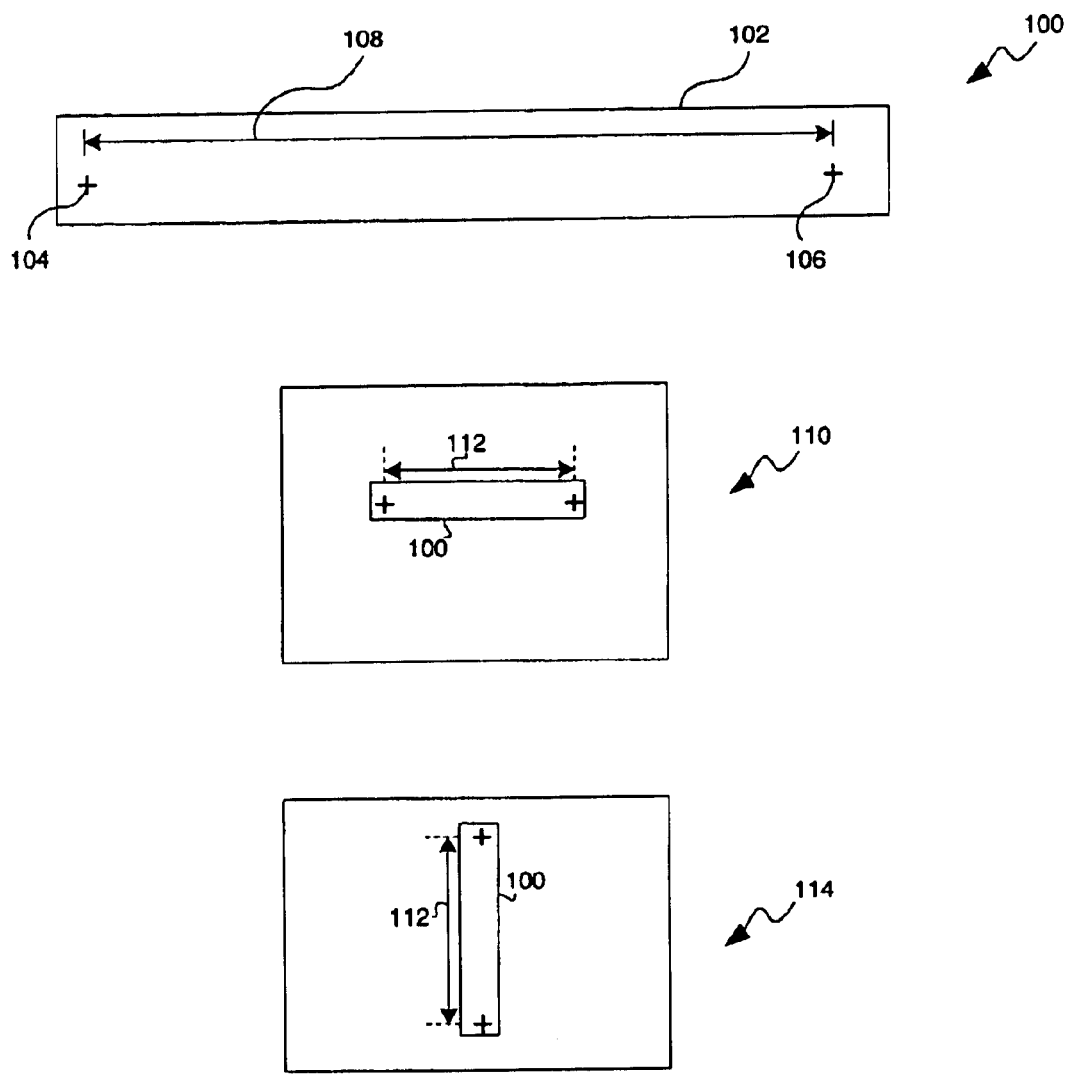
FIG. 1 depicts an instance of a calibration device, an image of the calibration device positioned horizontally, and an image of the calibration device positioned vertically.
Figure 2:
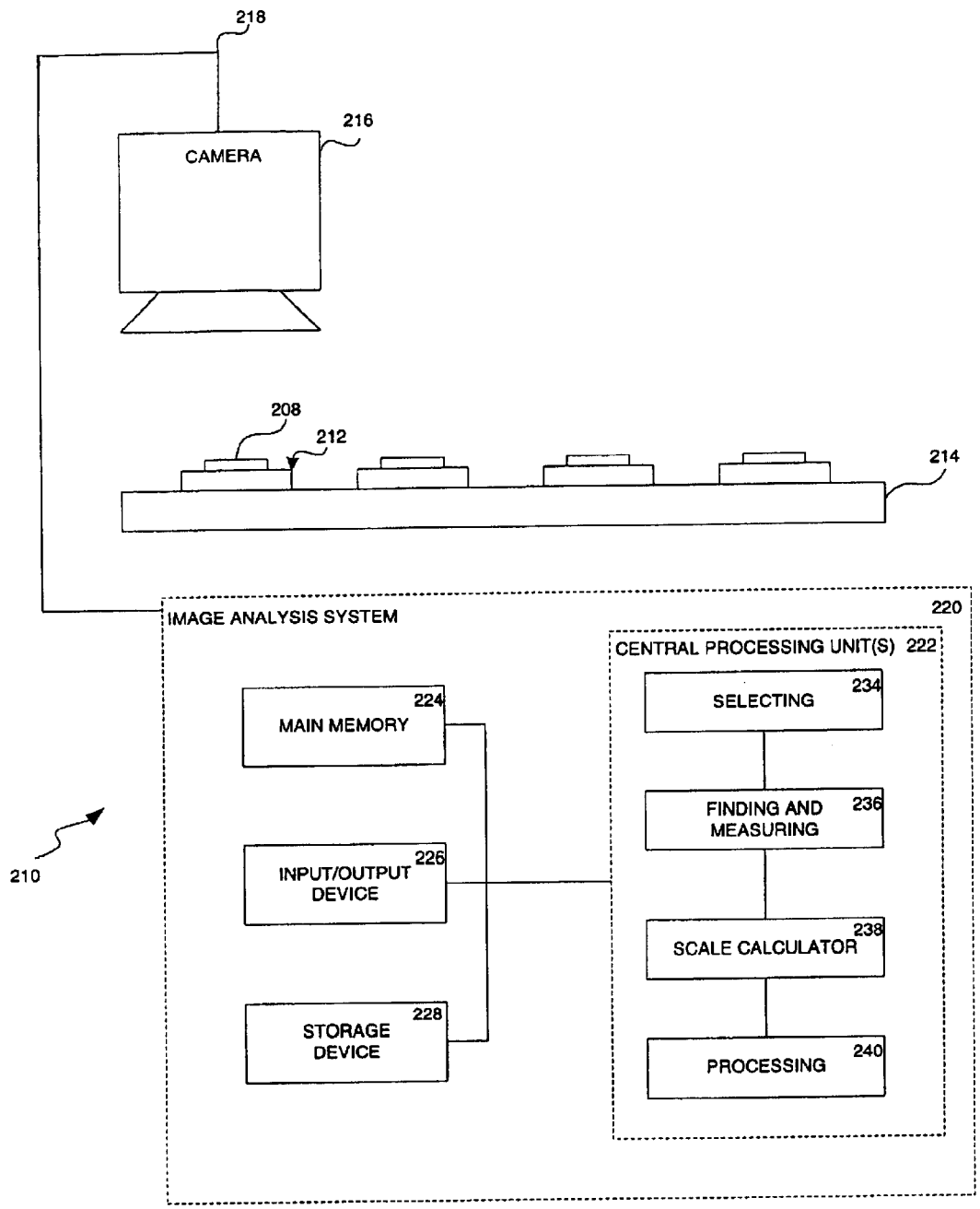
FIG. 2 depicts a schematic machine vision system for practice of the invention.

FIG. 2 illustrates a machine system 210 of the type in which the invention is practiced. The system 210 includes a capturing device 216, such as a conventional video camera or scanner, that generates an image of an object 212. Image data (or pixels) generated by the capturing device 216 represent, in the conventional manner, the image intensity (e.g. color and/or brightness) of each point in the scene at the resolution of the capturing device 216. Typically, the object 212 is held on a transport medium 214, such as a conveyor belt, by suction (not shown), for example. The capturing device 216 images the object 212 as it passes. Other configurations for bringing the object 212 in front of the capturing device 216 are known in the art. In this instance, the imaging system includes the capturing device 216, a digitizing element (not shown), which is inside an image analysis system 220 or inside the capturing device 216. As known in the art, the imaging system also includes the physical relationship between the capturing device 216 and the scene, i.e. the object 212 and transport median 214 within the field of view of the capturing device 216.

The capturing device 216 transmits image data via a communications path 218 to the image analysis system 220. This is a conventional digital data processor, or a vision processing system of the type commercially available, for example, from the assignee hereof, Cognex Corporation, programmed in accord with the teachings hereof to determine a scale relationship for an imaging system.

The image analysis system 220 may have one or more central processing units 222, main memory 224, an input-output system 226, and one or more disk drives (or other mass storage device) 228, all of the conventional type.

The image analysis system 220 and, more particularly, the central processing unit 222, is configured by programming instructions according to the teaching hereof to calculate a scale relationship for an imaging system so that one can convert pixel dimensions from an image to physical dimensions.

The central processing unit 222 includes a selecting module 234, a finding and measuring module 236, a scale calculating module 238, and a processing module 240. The selecting module 234 selects a characteristic associated with the object 212, where the characteristic has a known value, as described hereinafter. The characteristic is a feature 208, and/or aspect thereof, on the object 212, for example. The feature 208 and/or aspect thereof is found in the image and measured by the finding and measuring module 236. The measurement of the feature 208, or aspect thereof and the known value provide, via mathematical relationships known in the art, the scale relationship for the imaging system. Thereafter, pixel dimensions in the image, and subsequent images acquired by the imaging system, can be converted to physical dimensions. Further, the apparatus of FIG. 2 is programmed to use the scale relationship to processes the image acquired thereby via the processing module 240, where processing can include many known functions or combinations thereof.

In one embodiment, the finding and measuring module 236 includes a modeling module (not shown), preferably a scale-invariant modeling module. The modeling module assists finding and, optionally, assists measuring the feature, as described in further detail hereinafter.

Those skilled in the art will appreciate that devices and modules within the central processing unit 222 can be partitioned in more than one manner without departing from the scope of the invention.

Those skilled in the art should appreciate that, in addition to implementation on a programmable digital data processor, the methods and apparatuses taught herein can be implemented in special purpose hardware.

Figure 3:
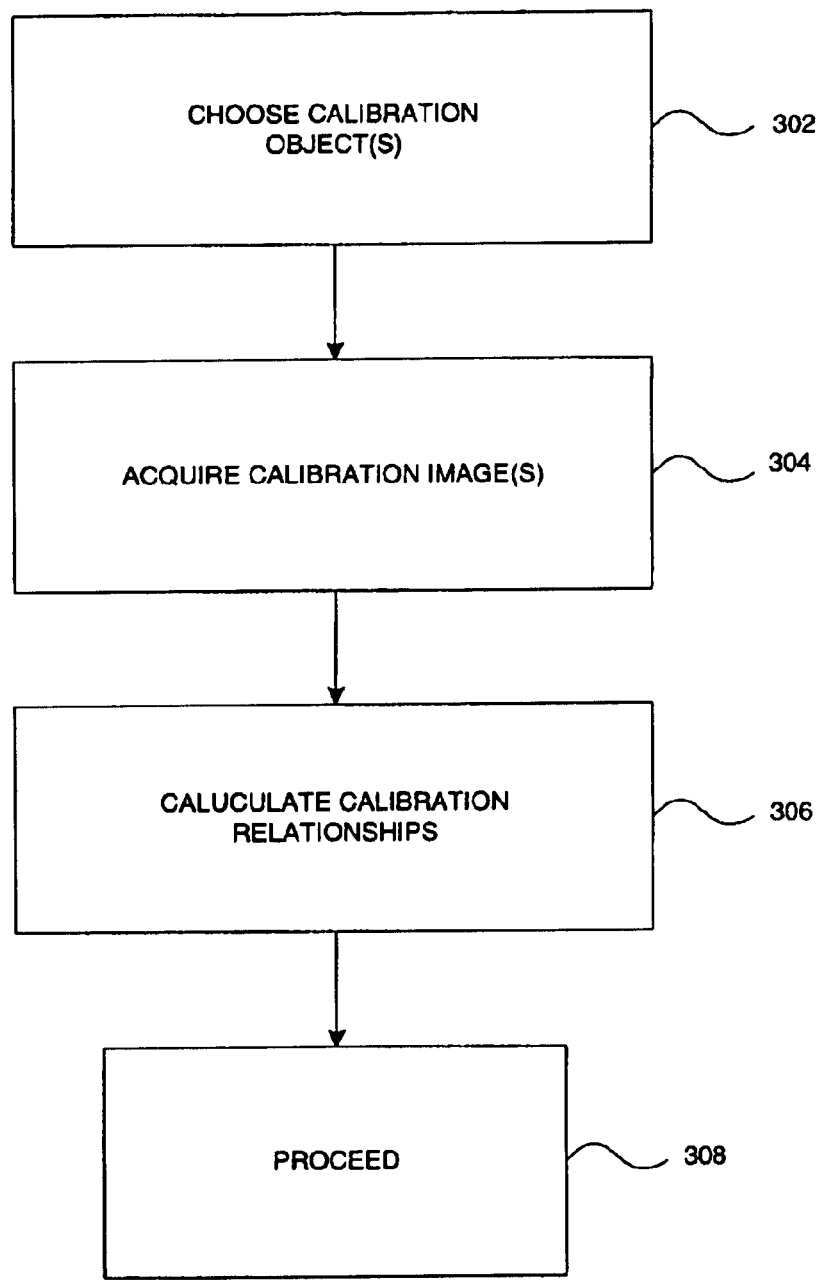
FIG. 3 is a flow chart summarizing operation of an instance of a prior art method for calibrating an imaging system.

FIG. 3 illustrates a flow chart, which summarizes a typical prior art method for calibrating an imaging system, where steps of the method are denoted in the detailed description in parentheses. As previously described, for a typical embodiment in the prior art, first a calibration object(s) is chosen (302). Then, an image(s) is acquired (304), from which the transform, e.g. scale and positional relationship, is calculated (306). Steps (302)–(306) complete the calibration of the imaging system. Only after the calibration is complete, i.e. after steps (302)–(306), can one begin training and/or operations tailored for a particular application (308). Once the training and/or operations begin (308), the physical relationships within the imaging system, such as the distance from the lens of the camera to the objects, remain substantially the same. The physical relationships are fixed and repeatable.

Figure 4:
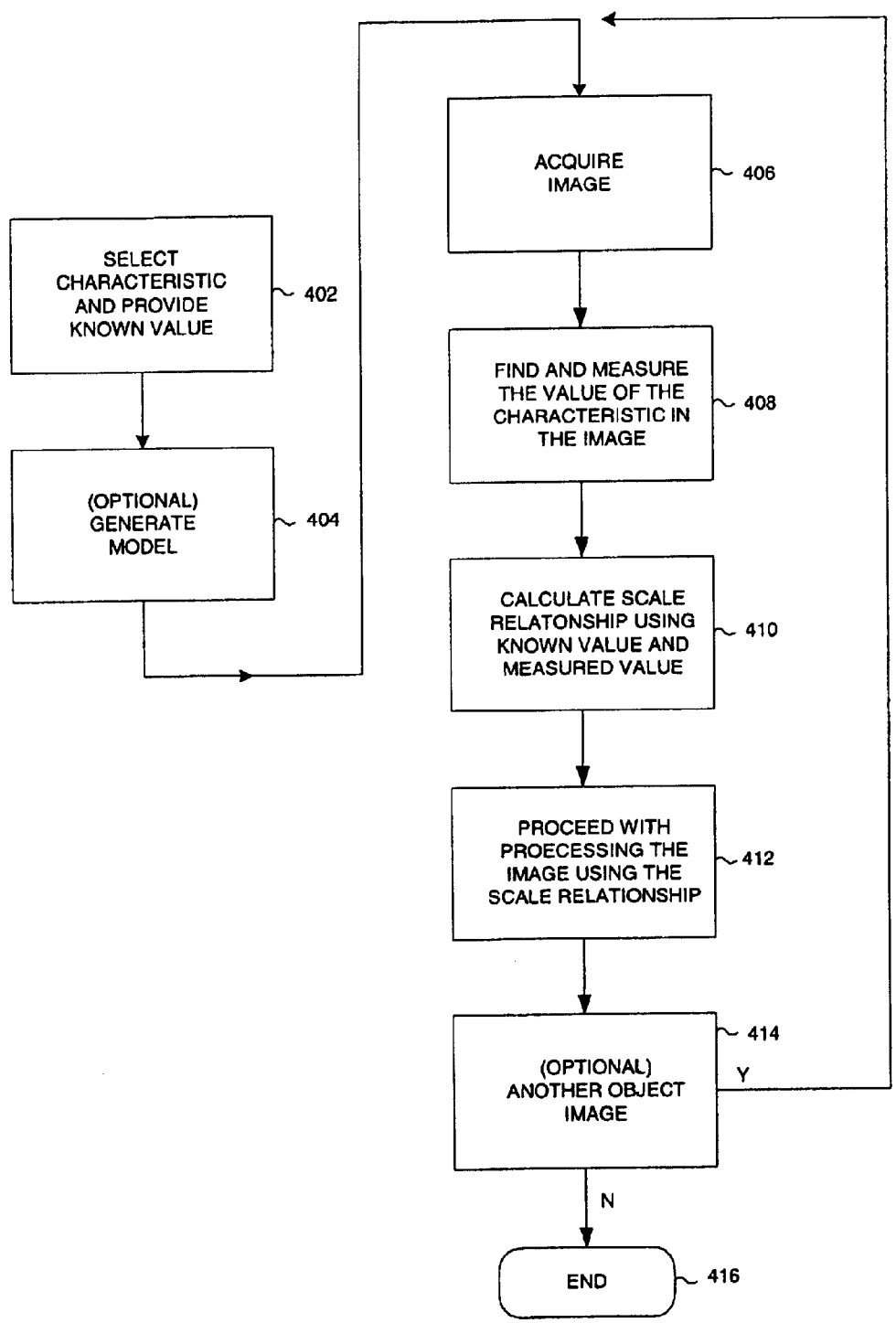
FIG. 4 is a flowchart summarizing operation of an embodiment of a method according to the invention that calculates a scale relationship for an imaging system.

In contrast, the method of FIG. 4 begins at the proceed step (308) of the prior art, where FIG. 4 illustrates a flow chart of an embodiment of a method according to the invention, where steps of the method are denoted in parentheses in the detailed description. Unlike the prior art, no separate calibration image(s) is acquired before the application-specific steps, i.e. (402)–(416). The method of FIG. 4 begins at the proceed step (308) of the prior art, and in one embodiment, the method omits the prior art steps (302)–(306). In another embodiment, some or all of the prior art steps of calibration are included before the application specific steps, i.e. (402)–(416), where the application dictates which portions of the prior art calibration steps to include.

Figure 5:
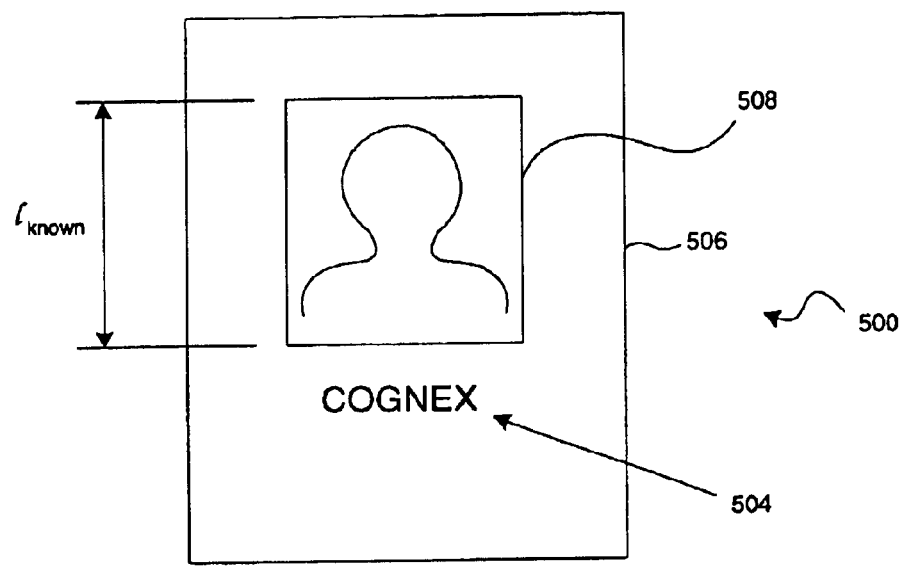
FIG. 5 depicts a Cognex employee identification-badge and an image of the badge, which are processed in the operation of FIG. 4.
Figure 5:
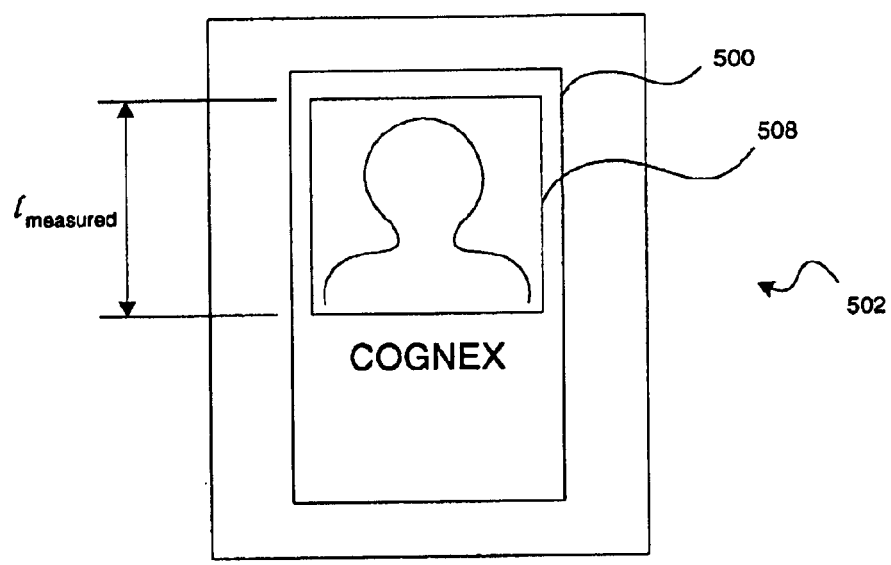

FIG. 5 depicts a Cognex employee identification-badge 500 and an image thereof 502, which will be described as part of an example with reference to the operation of FIG. 4.

First, a characteristic of the badge is selected (402). The characteristic must have a known value, where the known value can be a shape, an area, or a dimension of a feature, for example, or the value of relationships between features, an instance of which is described hereinafter with reference to FIG. 12, or a relative value between features, for example. The known value can also have a range of values, but the scale relationship would have a corresponding range of uncertainty.

For the badge 500, the characteristic could include, for example: all, or part of, the wording COGNEX 504 and/or an aspect(s) thereof the outer rectangular 506 of the badge 500 and/or an aspect(s) thereof, or the inner square 508, which is horizontally centered on the badge 500, and/or an aspect(s) thereof, such as the length of a side of the square 508, designated $l_{known}$.

The characteristic can be an inherent feature, boundary thereof, and/or an aspect(s) thereof, a provided feature, such as a fiducial positioned on, or adjacent to, the object, as known in the art, a boundary thereof, and/or an aspect(s) thereof, or a relationship between more than one feature, for example. The characteristic and the known value chosen depend upon the available options for the characteristic in an application and the ease with which each option is accurately found, for example.

Further, the application typically dictates whether the characteristic chosen is, or is not, rotationally symmetric. Either one is acceptable.

The invention recognizes that a known value of a characteristic of an object can be leveraged to calculate the scale relationship for an imaging system.

Once the characteristic is selected, the known value of the characteristic is provided (402) via direct operator input, from a data base, or ascertained from a training image.

Those skilled in the art will realize that application-dependent training steps (not shown) may be required to subsequently process the image at step (412), such as provide acceptability ranges for defects, for example.

Thereafter, the image 502 of the badge 500, which will be subsequently processed at step (412), is acquired (406) or supplied from a database as known in the art. An image of a reflection or other representations can also be used without departing from the scope of the invention.

In the image 502, the square 508 is located, and the length of a side of the square, $l_{measured}$, is measured (408), using techniques known in the art. For instance, a connected-component analysis could find the square 508. A connected-component analysis classifies pixels in the image as background or object pixels, joins the object pixels to make discrete sub-objects using neighborhood-connectivity rules, and computes various moments of the discrete sub-objects to determine any objects position, size, and orientation. Blob is an application of a connected-component analysis sold by the assignee hereof. Alternatively, a known gauging technique can measure $l_{measured}$, where Caliper Tool is an instance of a gauging technique sold by the assignee hereof In a preferred embodiment, however, the square is found and measured using a model, which is optionally generated during training (404). Typically, the application dictates the type of model used.

One type of model is a template model. A template model can be an image template of the square 508, where the image template is a "golden" image (i.e. a known good image) or a composite image created by adding together characteristics identified from multiple images of the square 508. A template model can also be created from a geometric description of the square 508, where the geometric description provides the basic geometry of the object.

The template is trained at various rotations, positions, and scales.

Later, the image 502 is searched to find the best match to the template using various, if not all, instances of the trained template, i.e. instances of the trained template are moved to various positions over the digitized image and compared to the image. The rotation, position, and scale where the best match between the template and image occurs is the rotation, position, and scale of the square 508. The image is searched using methods known in the art, such as normalized correlation search, for example. Typically, the search is optimized for each application using known techniques, such as removing or limiting one or more degrees of freedom from the search, doing a coarse search followed by a finer search, or binarizing the image before the search, for example.

A preferred embodiment uses a scale-invariant geometrical model, where a scale-invariant geometrical model finds the object, substantially regardless of the scale of the object in the image. Tools having invariance to one or more degrees of freedom can be used to generate the scale-invariant model and search the image, such as PATMAX, a tool developed and sold by the assignee hereof or HEXSIGHT, a tool developed and sold by Adept Technology Incorporated. For instance, the training processes use a training pattern, such as a template, for example, to select features to represent the square. A feature detection algorithm produces a geometric description of square boundaries from an image. This geometric description comprises a set of boundary points that lie along contours separating dissimilar regions in the image. Each boundary point specifies both position and orientation. Once the boundary points are generated, they are transformed by parameterized mathematical algorithms to produce translated, rotated, scaled, and stretched patterns of the square. The pattern search of the image 502 is then reduced to searches over parameter values.

In one embodiment, a training image provides an initial scale for the model. A training image of the badge 500 is acquired, the square 508 found, $l_{measured}$, measured, using any known technique, and the model created (404) as squares with the length of a side $l_{measured}$. In another example, an initial scale for a model can be the known value (402) divided by the value measured from the training image.

A model can be generated i.e. step (404), however, without using a training image.

Next, the transform is calculated (410). In this simplified example, where both lengths are vertical lines, the transform is as follows:

scale relationship=$l_{known}$ (physical units)/ $l_{measured}$ (pixels)

Those skilled in the art should appreciate that given the measured value and the known value, e.g. $l_{known}$ and $l_{measured}$, other known mathematical equations can be used to calculate the transform, such as lengths not measured along the x- or y-axes, for instance. Those skilled in the art should further appreciate that other lengths can be measured, such as the diagonal, and used with known equations to calculate the transform or that the scale relationship for two directions can be calculated independently.

The transform is then used to process the image 502 (412), where processing can include: inspecting, moving, bonding or other known processes completed on, or with the aid of, an image, for example.

After processing one image using the transform (412), the process may end (416) or optionally, (414) a second image is acquired (406), and a new scale relationship calculated (408–410), as previously described, to process the second image (412).

Alternatively, the scale relationship calculated (410) for the first image is used for more than one image, but intermittently checked using the method described above.

The invention recognizes that a single image can be used to calculate the scale relationship for the system, and thereafter, processed using the transform derived therefrom. Thus, the invention eliminates, and/or decreases the need for a separate calibration image(s) and/or object(s).

Those skilled in the art will realize that the method can supplement the prior art calibration described with reference to FIG. 3, i.e., the method verifies or enhances the accuracy of the prior art calibration, as well as replaces all or part of the prior art calibration.

Figure 6:
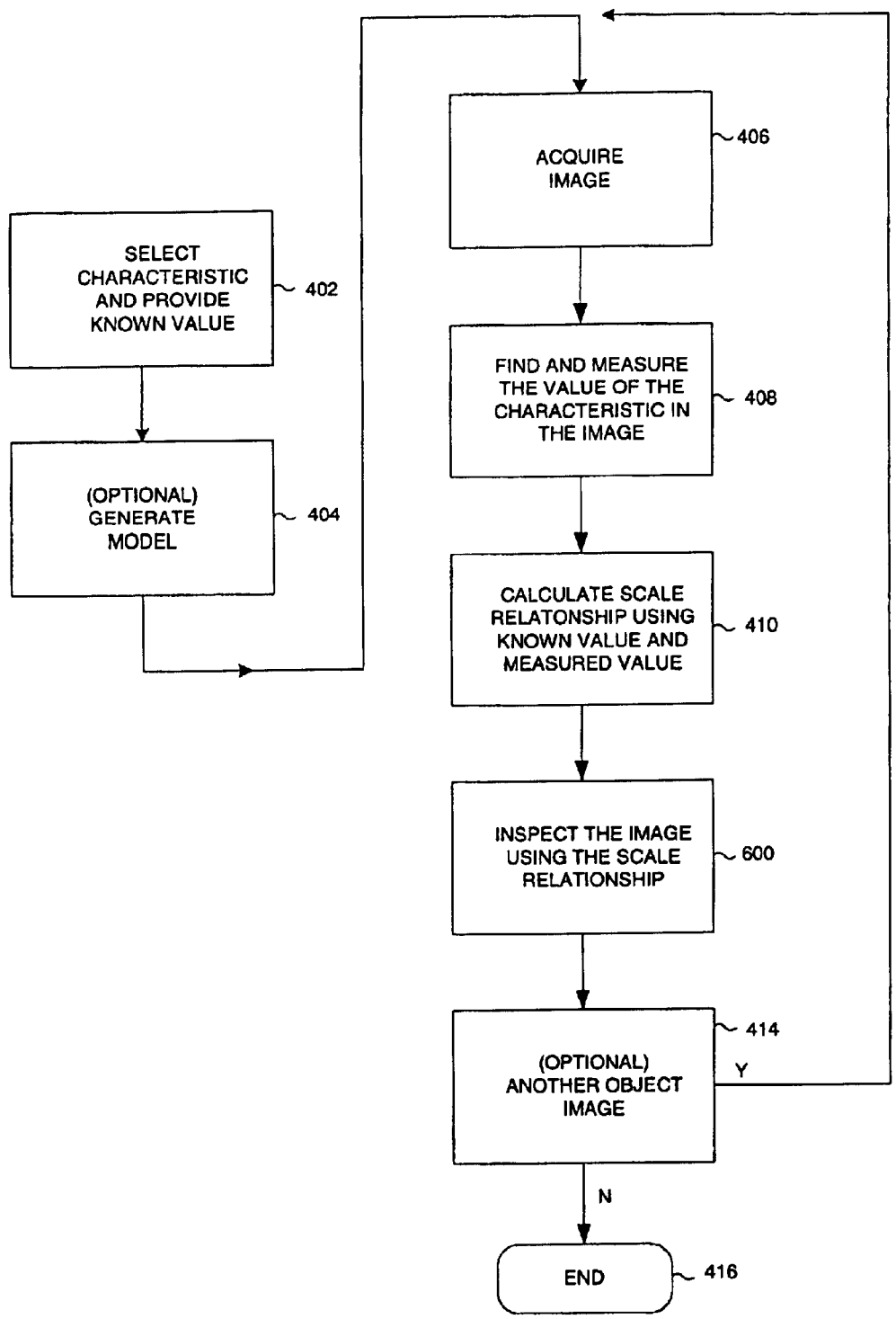
FIG. 6 is a flowchart summarizing operation of an embodiment of a method according to the invention that calculates a scale relationship for an imaging system and uses the scale relationship to inspect the image.

FIG. 6 is a flow chart of an embodiment of a method according to the invention, where steps of the method are denoted in parentheses in the detailed description, and where like numerals designate like steps.

FIG. 6 is an instance or an embodiment of FIG. 4. FIG. 6 differs from FIG. 4 in that the processing step (412) of FIG. 4 is specified as an inspection step (600). An inspection is a well suited embodiment of the method because often an inspection hinges on the size of potential defects in the image. With an unreliable scale relationship, the apparent size of the potential defects change, and thus, frustrate an inspection, whereas FIG. 6 generates a reliable scale relationship, as previously described, for an inspection.

Again, the method requires a known value of the feature before the image is acquired, that is used with the measured value, after the measured value is derived from the image, to calculate the reliable scale relationship, which thereafter, is used to provide accurate sizes for defects.

The feature and/or aspect thereof used as the characteristic once found, does not indicate the position or location of any potential defects, i.e. step (408) does not tell the inspection step (600) where to look next in the image for defects.

The method is particularly useful for inspecting a fiber-optic end-face. Though this is a form of a preferred embodiment, this embodiment should be considered illustrative, and not restrictive.

Fiber-optic technology transmits energy, as light, through glass fibers, which is used to transit and receive analog and digital signals. A typical, simplified fiber-optic system consists of a transmitter, a transmission medium, and a receiver, where the transmission medium is a fiber-optic cable.

Figure 7:
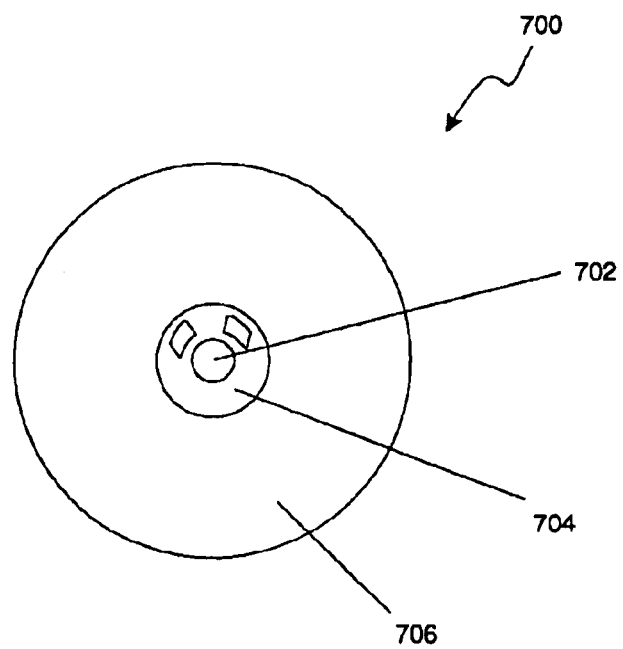
FIG. 7 depicts two magnifications of end-views of an end-face of a fiber, not drawn to scale.
Figure 7:
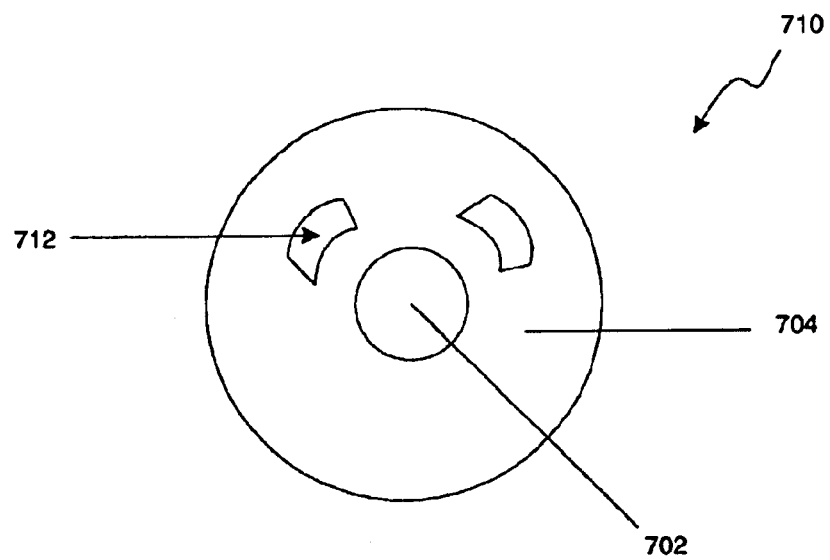
Figure 8A:
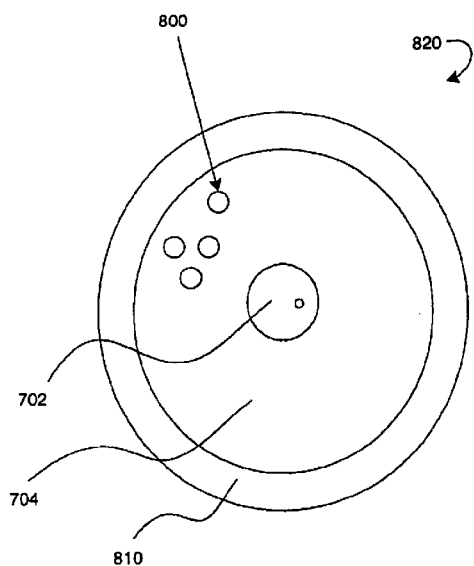
FIGS. 8A, 8B, 8C, and 8D depict simplified examples, not drawn to scale, of end-views of part of an end-face of fibers that contain, debris, scratches, cracks, and epoxy spots and fretting, respectively.
Figure 8B:
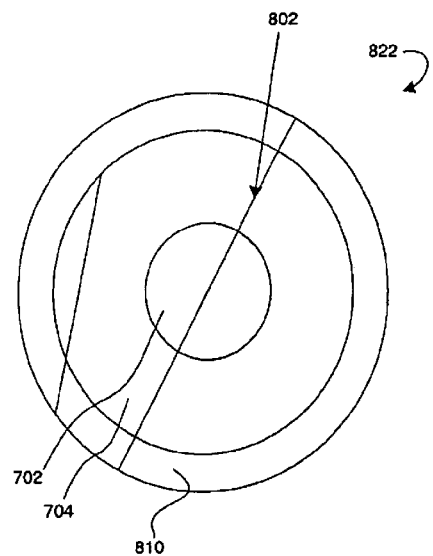
Figure 8C:
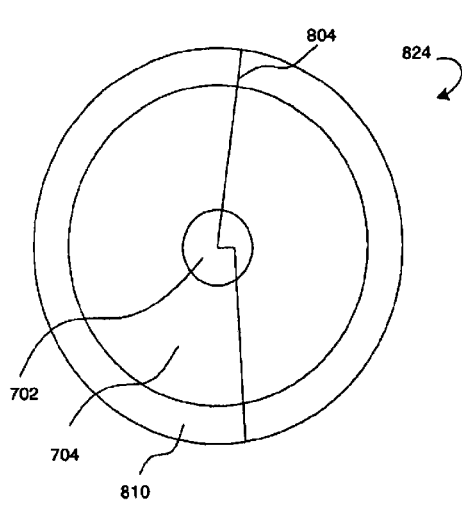
Figure 8D:
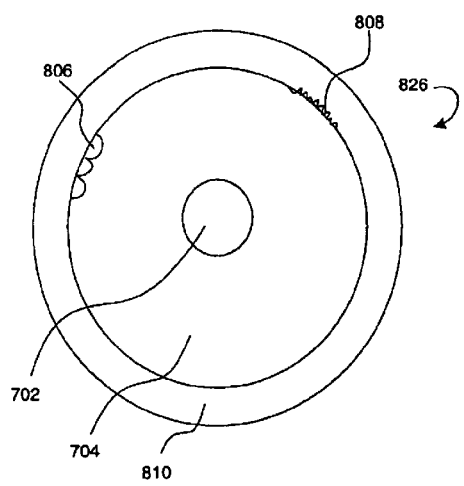

FIG. 7 illustrates an end-view of a typical fiber-optic cable end-face 700 at two magnifications, both not drawn to scale. The fiber-optic cable includes a core 702, which carries the light, a cladding 704 positioned around the core, which reflects the light back into the core 702, such that the light is propagated by internal refraction as known in the art, and one or more coating, insulating, shielding, and/or support layers 706. The core 702 is made of pure glass drawn out into a fine strand. The cladding 704 is one or more layers of doped glass, which are doped to have a lower index of refraction than the core 702. Thus, the cladding 704, as known in the art, causes the light to be directed back into the core 702. The cladding may include stress rods 712 extending throughout the fiber to provide extra support, where the end-faces of the stress rods are typically circular, but can also be curved rectangles, where in the art, fibers with circular stress rods are called "panda" fibers and fibers with rectangular stress rods are called "bow-tie" fibers.

Fiber-optic cable is classified by transmission type, where transmission types include single-mode or multi-mode, for example, where mode is a term known in the art. Single-mode cable propagates one mode of light, where multi-mode fiber acts to focus broader bandwidth of light. In a multi-mode cable, the core 702 consists of multiple layers of glass, where each layer is doped to exhibit a slightly lower index of refraction than the previous layer to accommodate the broader bandwidths of light Typically, therefore, the diameter of the core 702 of multi-mode fibers is larger than single mode fibers, and ranges from around 62 microns to around 8 microns, respectively, at today's technology. For both types of cable, however, the cladding diameter is typically 125 microns.

Within the fiber-optic system, the fiber-optic cable is cut and connected to other fibers, transmitters, and/or receivers, with various connection configurations. After cutting the core, the cladding, and, optionally, any surrounding layers present at, or near, the fiber-optic end-face are polished by processes known in the art.

Typically, the fiber-optic end-face is inspected, after polishing, during routine maintenance or cleaning, and after connecting or disconnecting fibers. Also, the fiber-optic end-face typically is inspected manually.

Turning to FIGS. 8A–8D, which depict simplified examples, not drawn to scale, of end-views of part of an end-face of fibers 820, 822, 824, 826, where like numerals represent like elements from FIG. 7. The end-face of the fiber-optic cable is inspected, primarily, to ensure the absence of unacceptable pits (not shown), chips, such as fretting 808, debris 800, including epoxy spots 806, scratches 802, and a crack 804, for example. Polishing often causes several of the defects, including the scratches 802, fretting 808, and chips. The acceptability of defects depends on the location, type, and/or size of each defect, where defects are often defied by the location from, within, or at the boundary of the core 702, cladding 704, epoxy 810, ferrule (not shown), and/or other support layers (not shown), for example. Within the core 702, less, if any defects, are acceptable. Typically, the closer the defects are to the core 702, the more likely they are unacceptable. Upon discovering and/or measuring defects, the fiber is rejected, re-polished, or accepted.

FIG. 9 illustrates an exploded view of a simplified schematic fiber-optic inspection station 924. As shown therein, a microscope 900 contains a positioning tube 902 adapted to receive and position the fiber-optic cable 904 for inspection. Often the fiber-optic cable 904 being inspected is terminated by a connector 906, having a housing 908 and a protruding support material 910, such as a ferrule. A ferrule connection is a known connection configuration, wherein, as shown in the side view of the fiber-optic cable 916 in FIG. 9a, the end 918 of the fiber-optic cable is terminated, any outside surrounding layers 912 are stripped, leaving the core and the cladding 914. The terminated end 918 is received by the connector 906. The connector 906 surrounds the core and cladding 914 with the ferrule 910, which extends beyond the housing 908, a end-view of the end-face 922 of the fiber optic cable 904 with the ferrule 910, and the core and cladding 914 is shown in FIG. 9b, not drawn to scale. Also, the cladding and core 914 extend slightly from the ferrule 910, where the extension of the cladding and core 914 extending from the ferrule 910 is exaggerated for illustration purposes. Typically, the cladding 704 is epoxied to the ferrule 910. A epoxy ring 810 between the cladding 704 and the ferrule 910 is sometimes visible, such as shown in FIGS. 8A–8D.

Typically, the protruding ferrule 910 is inserted into the positioning tube 902. As known in the art, the positioning tube 902, and, optionally, other known related devices (not shown), assist in holding the end-face 922 in proper position in the x-, y-, and z-plane to be viewed under the microscope lens 920.

Typically, the fiber optic end-face 922 is brought into focus manually after the ferrule 910 is inserted into the positioning tube 902.

Unfortunately, however, the z-plane in this configuration 924 moves. There is some leeway. Thus, the end-face 922 is not at a distance u, but at u±leeway.

The current inspection set-up 924, because of the variation in the distance u, i.e. ±leeway, cannot reliably use the same scale relationship for all images taken by the inspection station 924. The scale relationship determined by the prior art is unreliable for all images taken thereby. The unreliable scale relationship causes apparent changes in location of potential defects. As previously described, potential defects are classified, at least in part, by their location, such as the distance from the core. The apparent changes in location caused by the unreliable scale relationship makes the potential defects appear farther from, or closer to, the core than they are. Thus, potential defects can be falsely identified or missed because they are classified as too close to, or too far from, the core, respectively. Further as previously described, the unreliable scale relationship causes apparent size differences of potential defects in the fiber optic end-face. If the z-distance is shorter, i.e. u–leeway, the potential defects will appear larger. If the z-distance is longer, i.e. u+leeway, the potential defects will appear smaller. Thus, the unreliable scale relationship may result in falsely identifying defects or missing defects, respectively. The unreliability caused by the current inspection mechanics is minimized, if not eliminated, using the method and apparatus described with reference to FIGS. 10 and 11, respectively.

Figure 10:
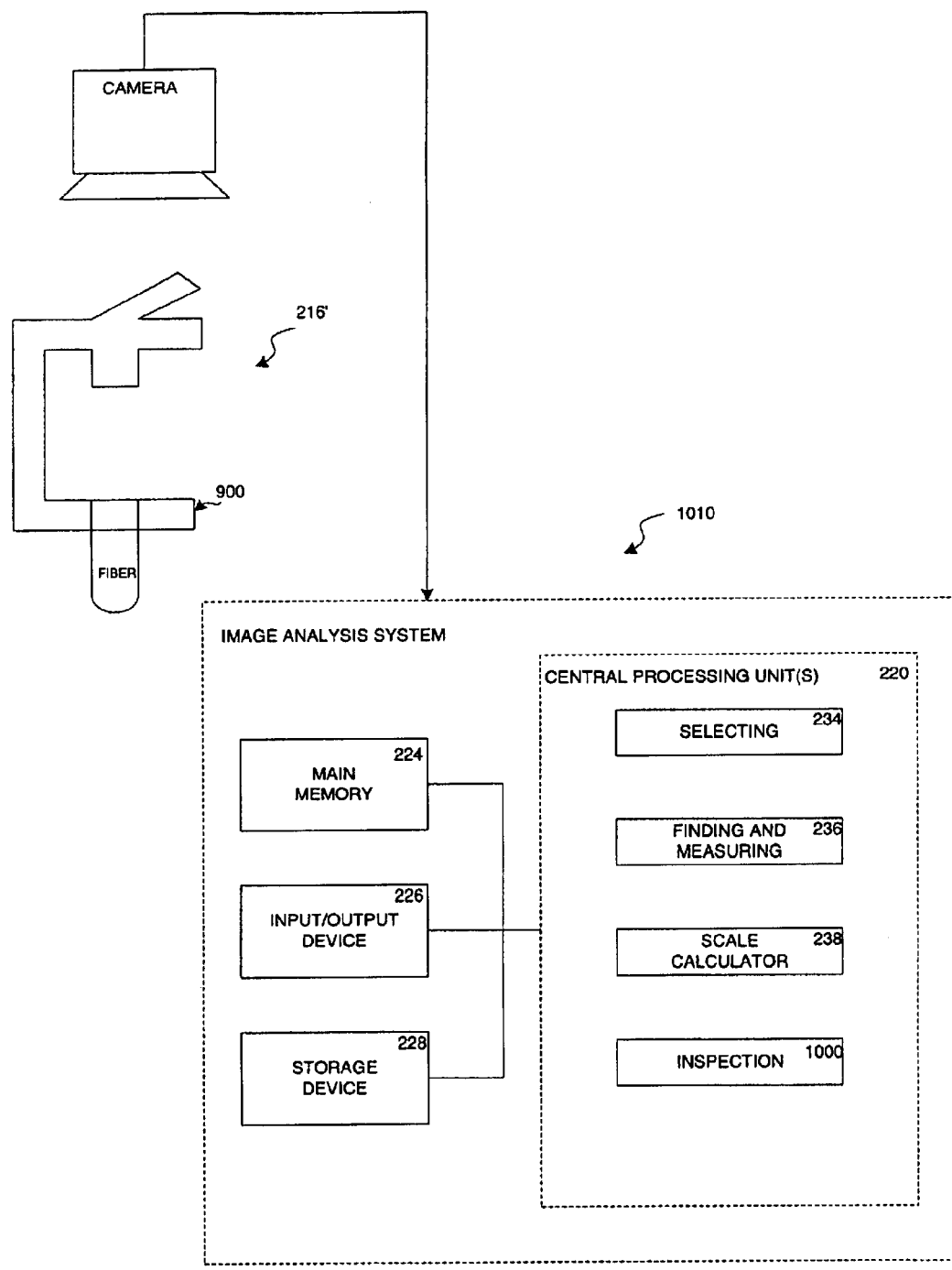
FIG. 10 depicts a schematic machine vision system for practice of the invention.

FIG. 10 illustrates a machine system 1010 of alternate embodiment or an instance, of the embodiment of FIG. 2, wherein like numerals designate like elements. The machine system of FIG. 10 is similar to FIG. 2, except it is expressly configured to capture and inspect an image of a fiber-optic end-face. Specifically, the capturing device 216' is a microscope 900 positioned in front of a conventional video camera, that captures an image of the end-face of the fiber. Further, the machine system 1010 is different because an inspection module 1000 replaces the processing module 240 of FIG. 2. The inspection module 1000 inspects the image of the fiber end-face to find defects, and uses the scale relationship, calculated as previously described, to ascertain the size of the defects. The inspection module 1000 performs other application-dependent functions as known in the art, such as classifying the defects, for example. Further, those skilled in the art will appreciate that other training functions, not shown, may be completed by the central processing unit 222 to effect the inspections, without departing from the scope of the invention, such as model generation, for example.

Figure 11:
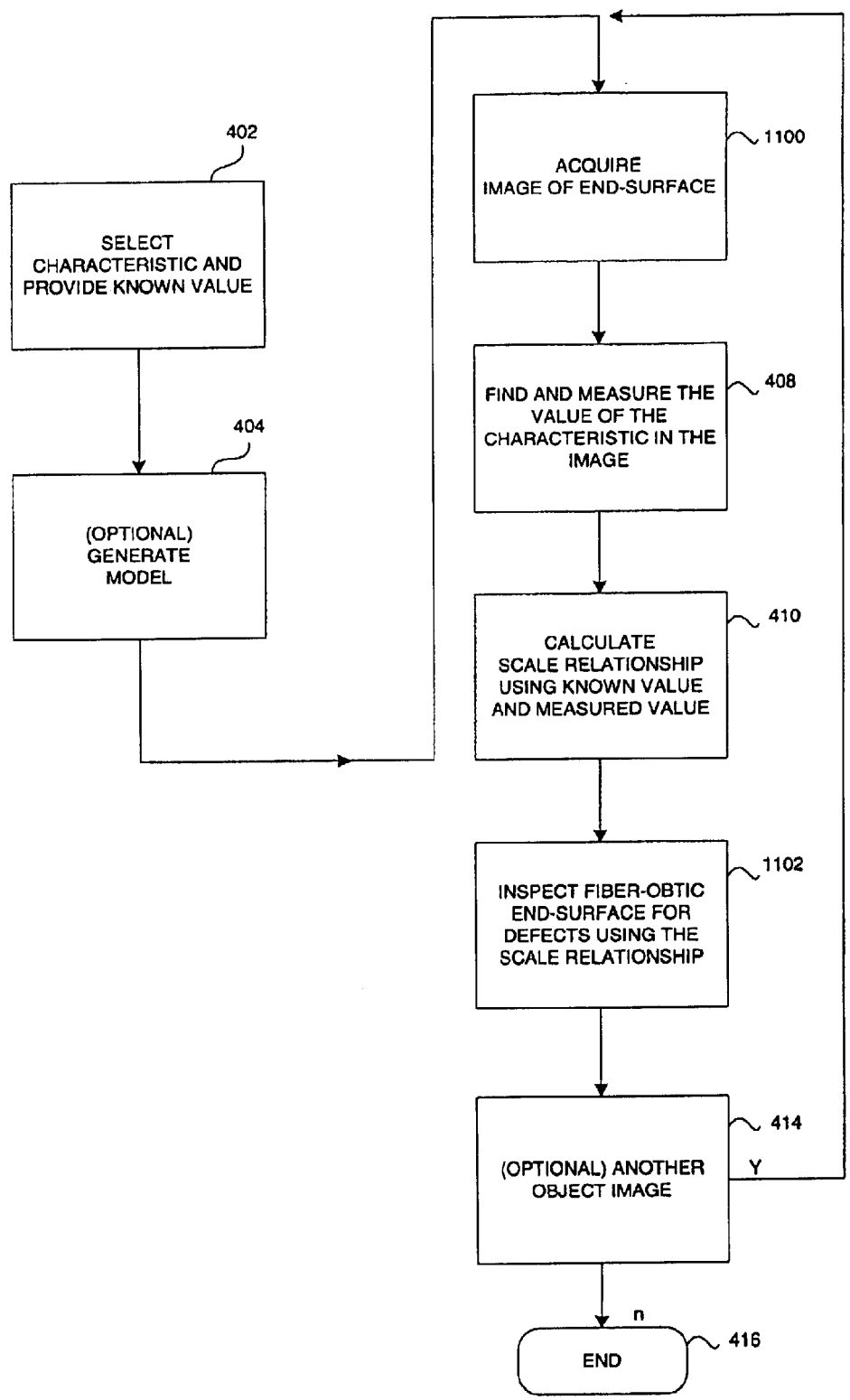
FIG. 11 is a flow chart summarizing operation of an embodiment of a method according to the invention that calculates a scale relationship for an image of a fiber end-face, and uses it to inspect potential defects in the fiber end-face.

FIG. 11 illustrates a flow chart of an embodiment of a method according to the invention, where steps of the method are denoted in parentheses in the detailed description, and where like numerals designate like steps.

FIG. 11 is an instance, or an embodiment, of FIGS. 4 and 6, where FIG. 11 also differs from FIG. 4 in that the processing step (412) of FIG. 4 is specified as an inspection step (1102). Further, the flow chart of FIG. 11 specifies a preferred embodiment, wherein the fiber-optic end-face is imaged (1100) and inspected (1102).

Figure 12:
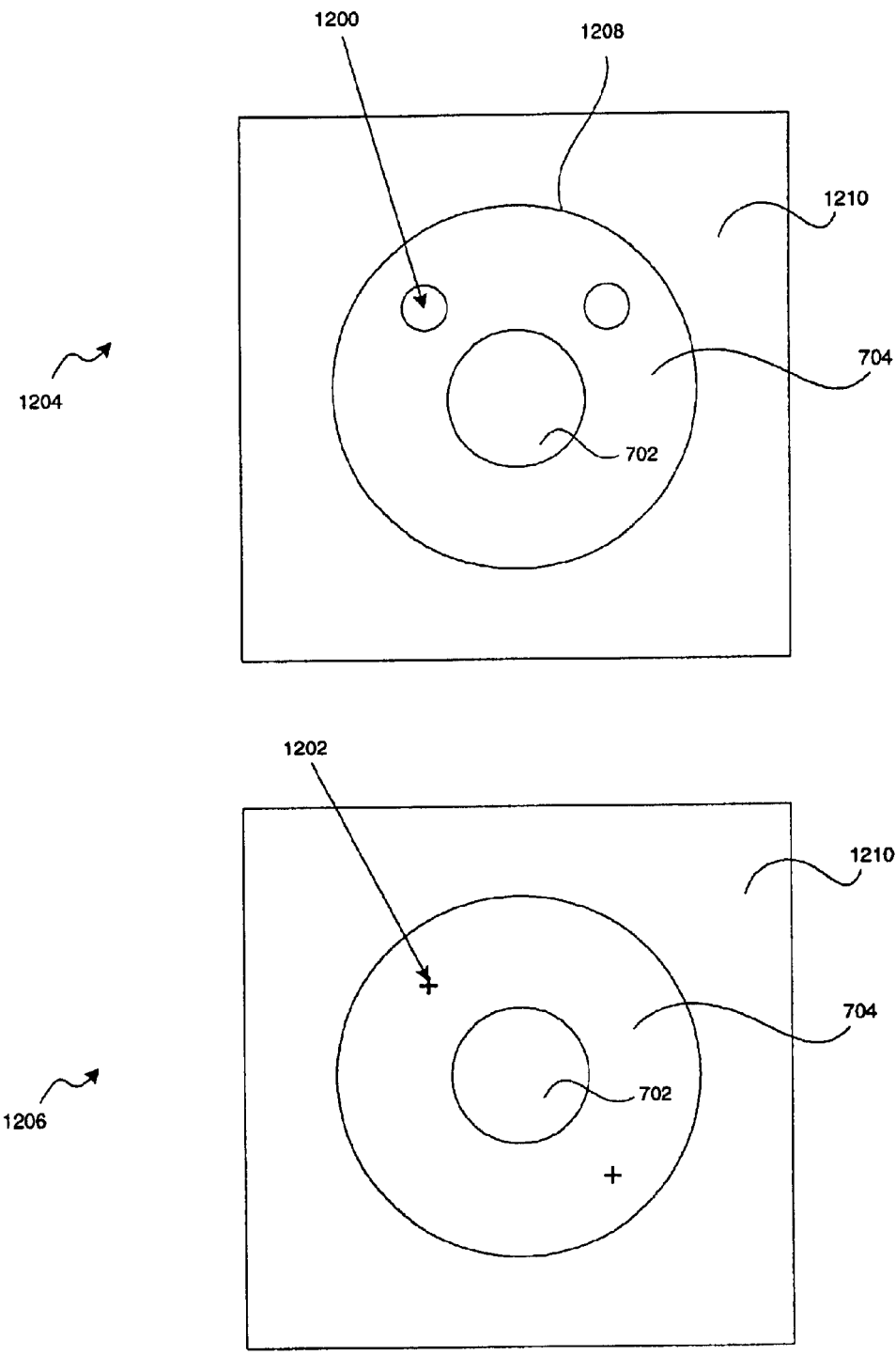
FIG. 12 depicts two images of part of the end-faces of fibers having inherent and/or supplied feature(s)

Again, a characteristic with a known value is selected (402), as previously described. FIGS. 7 and 12 depict several possible examples of characteristics for fiber-optic end-faces, and are described hereinafter with continuing reference to FIG. 11, where like numerals indicate like elements.

In a preferred embodiment, the characteristic is the diameter of the cladding 704. As previously discussed, the diameter of the cladding of many fiber-optic cables is 125 microns, which, therefore, makes the diameter a useful known value. Further, the boundary of the cladding 1208 from which the diameter can be used to measure the diameter, is symmetrical, and, therefore, is amenable to many forms of locating algorithms. Those skilled in the art should appreciate that other aspects of the cladding can also be the characteristic having the known value.

The core 702, and/or an aspect thereof, such as the diameter, are also a possible characteristics. However, because of the smaller size of the core 702 and variation in intensity in an image, the core 702 can image as light or dark, the core 702 and/or aspect(s) thereof 702 is a less viable characteristic than the cladding 704 and/or aspect(s) thereof.

Other choices for a fiber end-face include, for example, the stress rods 1200, 712, and/or aspect(s) thereof, such as area, for example. Those skilled in the art should appreciate that other features of the end-face or aspects thereof can be the characteristic.

Also, the characteristic could be any relationship between features alone, or combined with the feature(s) or aspect(s) thereof, such as the distance between centers of mass of the stress rods 712, 1200, the average area of the stress rods 712, 1200, and the distance between the stress rods 712, 1200, for example.

Further, the characteristic can be a supplied feature or aspect thereof such as a fiducial(s) 1202 or a calibration target, for example. For fiber, the one or more supplied features, such as the fiducials 1202, must be positioned away from the core 702 to not interfere with the transmission of light, but close enough to the core 702 to be within the field of view of a typical microscope inspection-station. Other fiducials, symmetrical and non-symmetrical, known in the art can be also used Then, the image of the fiber end-face is acquired or supplied from a database (1100), as known in the art, such as images 1204, 1206, for example. Again, a reflection of the end-face or other representations can be used without departing from the scope of the invention.

Thereafter, the image 1204 is searched (408), as previously described.

In a preferred embodiment, the image 1204 is searched using an optionally generated model (404). In the fiber-inspection embodiment, a scale-invariant model is preferred. A scale-invariant model alleviates misidentifying a thin annular boundary of the cladding region when the scale of the cladding 704 is different from the scale expected by a more rigid model, i.e. not scale invariant. A preferred embodiment uses a synthetic scale-invariant model. A synthetic model is aptly suited for the search (408) because the characteristic is a circular boundary 1208.

In one embodiment during the search (408), the presence of defects at the circular boundary 1208 is addressed by specifying the polarity between the cladding 704 and the ferrule 1210, such as light-to-dark polarity or dark-to-light polarity, where polarity is a term known in the art Typically for a front-lit end-face, the cladding 704, and any fretting therein, is light and the ferrule 1210, and any fretting therein, is dark, where front-lit is also a term known in the art. In one instance, therefore, the search looks for a circular boundary that matches the synthetic scale-invariant model having a light-to-dark polarity traveling from the center outward, and finds and measures the "best" circle on the inside of any dark fretting or epoxy. The best circle is determined from a score output from the search tool, where most tools known in the art output a score. The specifics of scoring schemes are known in the art. Those skilled in the art should appreciate additional or different techniques can be used to help find and measure the diameter of the cladding without departing from the scope of the invention.

Once the cladding is located and the diameter measured, $d_{measured}$, the scale relationship is calculated, as previously described (410), using the $d_{known}=125\mu$ and $d_{measured}$. Thereafter, the scale converts, into physical dimensions, the sizes of the defects located during inspection of the fiber end-face. The end-face is inspected (1102) using the scale relationship and tools known in the art, such as a connected-component analysis and gauging techniques, for example.

Typically, the process is repeated for a second fiber-optic end-face (414) before the inspections are complete (416).

Figure 13:
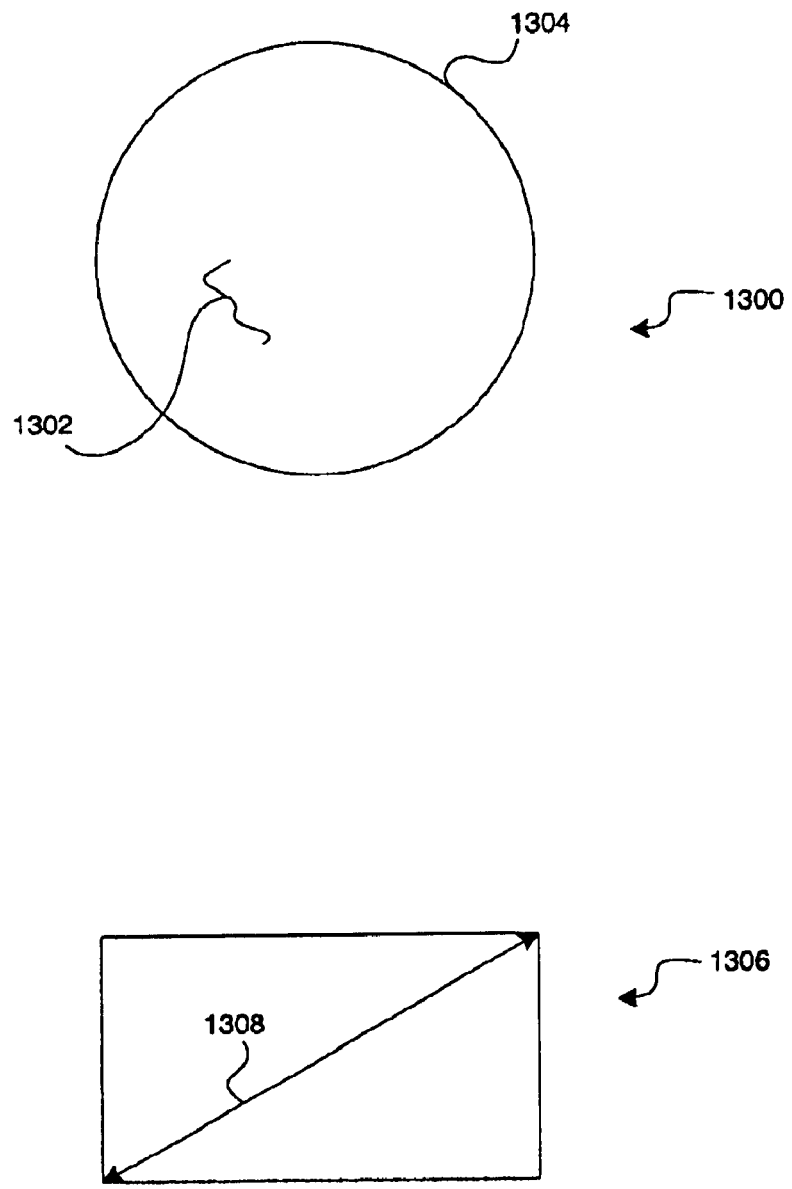
FIG. 13 depicts images of other objects for which a scale relationship can be determined using the methods of the invention.

FIG. 13 depicts images of other objects for which a scale relationship can be determined using the methods disclosed herein. A top-view of a concave lens 1300 depicted therein can be inspected for scratches 1302 or other defects using the diameter of the boundary 1304 as the known value of the characteristic, for example. Also, a laser-diode 1306 can be inspected using the diagonal length 1308 of the laser-diode as the known value of the characteristic, for example. Those skilled in the art should appreciate that other objects can be inspected or processed using the methods disclosed herein.

The invention recognizes a procedure can benefit from the methods disclosed herein when dimensional tolerance for a feature, such as machine tolerance for a part, is greater than placement tolerance for a feature on the z-plane. For instance, while the distance from a satellite to the earth may change, the area of the hood of a hum-v that is in an image taken by the satellite is quite precise, for example.

Those skilled in the art should also appreciate that the method can supplement the prior art calibration described with reference to FIG. 3, i.e., the method verifies or enhances the accuracy of the prior art calibration, as well as replaces all or part of the prior art calibration. For example in the fiber application, the prior art calibration can be used to calculate transforms for correcting optical distortion while the scale relationship is re-calculated as disclosed herein. Those skilled in the art should also appreciate that the methods disclosed herein can supplement the prior art calibration in any application wherein the imaging system changes by keeping the prior calculated optical distortion transforms or positional information, for example, and combining it with the scale relationship re-calculated as described herein.

Those skilled in the art should further appreciate that objects can be provided with calibration targets, such as a grid of dots for example, used for calculating the scale relationship or other calibration information "on-the-fly".

Those skilled in the art should also appreciate that inspection configurations, not described herein, with or without microscopes, may benefit from the methods and apparatuses disclosed herein, without departing from the scope of the invention.

Those skilled in the art should also appreciate that other defects on, or aspects of, a fiber-optic cable, such as circularity of the core or cladding, for example, not mentioned herein, can be interpreted using the scale relationship derived, as disclosed herein, without departing from the scope of the invention.

Those skilled in the art should fierier appreciate that the finding and measuring described herein can be performed with respect to more than one characteristic at a time.

Those skilled in the art should further appreciate that in addition to human operators, tools available in the art, with instructions according to the teachings herein, can select the characteristic from the image, such as a feature extractor or a form of a fiducial selector, such as AUTOSELECT sold by the assignee hereof, for example.

Those skilled in the art should also appreciate that any method of: model generation, finding, measuring, calculating, processing, and inspecting can be used in accordance with the teachings hereof, without departing from the scope of the invention.

Those skilled in the art should further appreciate that additional application-dependent training steps (not shown) may be required to subsequently process or inspect the image at steps (412), (600), and (1102), such as provide acceptability ranges for defects, for example, without departing from the scope of the invention.

Those skilled in the art should further appreciate that the information relating to the feature(s) or object can be obtained using vision tools known in the art, not mentioned herein Those skilled in the art should further appreciate that a portion of the information obtained from an operator or database can be used as a starting value for the known value or the portions of the model, for example. Also, a scale relationship calculated by the prior art calibration can be used as an initial estimate of the scale relationship that is updated by the methods disclosed herein, where the estimate can be used during modeling, for example.

Those skilled in the art should further appreciate that the steps, devices, or modules disclosed herein can be partitioned differently without departing from the scope of the invention, such as partitioning the finding and measuring or selecting the characteristic and providing the known value, for example.

Those skilled in the art should further appreciate that some, or all, of the steps of selecting, model generating, finding, measuring, calculating, inspecting, and processing herein before described can be combined and effected as hardware implementations, software implementations, or a combination thereof.

Those skilled in the art should further appreciate that only a portion of the characteristic needs to be acquired in the image, or that more than one image can be combined to create a composite image of the characteristic. Further, those skilled in the art should appreciate that the image can be of an entire object, part of one object, such as in multiple field of view inspections, or part of multiple objects, where multiple field of view inspections construct a virtual image of entire object from multiple images of part of the object, as known in the art.

Furthermore, those skilled in the art should further appreciate that any of the images described herein can be subject to further processing, such as by filtering using a Gaussian filter, median filter, smoothing filter, morphological filter or the like known in the art, in order to enhance processing.

Those skilled in the art should also appreciate that using reduced-resolution images upon which to initially search for the characteristic or during steps (402)–(404) could decrease processing time. Further, any combination of full-resolution and reduced-resolution images can be used. However, use of reduced-resolution images typically results in a loss of accuracy.

Those skilled in the art should appreciate that although the invention described in several illustrative embodiments herein effects analysis of intensity data (and edge data for at least one embodiment of model generation), it can be similarly implemented in processes to effect analysis of other image data, such as gradients of pixels, discrete histogram data from an image, or various other representation of aspects of image data or groups thereof, for example.

Other modifications and implementations will occur to those skilled in the art without departing from the spirit and the scope of the invention as claimed. Accordingly, the above description is not intended to limit the invention except as indicated in the following claims.

What is claimed is:

1. A method for calculating a scale relationship for an imaging system, the method comprising:

(a) selecting a characteristic having a known value, the characteristic associated with an object;

(b) acquiring, using the imaging system, an image of at least a portion of the characteristic of the object;

(c) finding and measuring the characteristic in the image to provide the measured value;

(d) calculating a scale relationship between the object and the image, using the measured value and the known value; and (e) processing the image using the scale relationship.

2. The method of claim 1, wherein the object is a fiber-optic end-face, and wherein selected the characteristic further includes:

selecting, as the characteristic, a diameter of a substantially annular cladding of the fiber-optic end-face.

3. The method of claim 1, wherein selecting the characteristic further includes:

selecting, as the characteristic, an aspect of a feature of the object, and wherein finding and measuring further includes:

finding the feature in the image and measuring the aspect of the feature to provide the measured value.

4. The method of claim 1, wherein finding and measuring further includes:
   generating at least one model of at least part of the object, the model including the characteristic;
   searching the image to find best match to the at least one model; and
   measuring the characteristic of the best match to provide the measured value.

5. The method of claim 4, wherein generating the at least one model, further includes:
   generating, as the at least one model, at least one scale-invariant model.

6. The method of claim 1, wherein finding and measuring further includes:
   finding the characteristic in the image and measuring an aspect of the characteristic in the image to provide the measured value.

7. The method of claim 1, wherein processing further includes:
   processing more than one image using the scale relationship.

8. The method of claim 1, wherein the characteristic associated with the object is associated with each object of a plurality of objects, the method further comprising:
   (f) repeating (b)–(e) with each of the plurality of the objects.

9. The method of claim 1, wherein the characteristic is a fiducial.

10. The method of claim 9, wherein the fiducial is a grid of dots.

11. The method of claim 1, wherein the characteristic is a relationship between features of the object.

12. The method of claim 11, wherein the characteristic is a distance between two fiducials on the object.

13. An apparatus for calculating a scale relationship for an imaging system, the apparatus comprising:
   an object having a characteristic with a known value,
   an image of at least a portion of the characteristic, the image being acquired by the imaging system;
   finding means adapted to find the characteristic in the image;
   measuring means, in cooperation with the finding means, adapted to measure the characteristic in the image to provide a measured value;
   scale means, in cooperation with the measuring means, adapted to determine a scale relationship between the image and the object, using the measured value and the known value; and
   processing means, in cooperation with the scale means, adapted to process the image using the scale relationship.

14. The apparatus of claim 13, wherein the object is a fiber-optic end-face, and wherein the characteristic is a diameter of a substantially annular cladding of the fiber-optic end-face.

15. The apparatus of claim 13, wherein the finding n further includes:
   modeling means, adapted to generate at least one model of at least part of the object, the at least one model including the characteristic; and
   searching means, in cooperation with the modeling means, adapted to search the image to find a best match to the at least one model, and
   wherein the measuring means is further adapted to measure the characteristic of the best match to provide the measured value.

16. The apparatus of claim 13, wherein the characteristic is an aspect of a feature of the object, and
   wherein the finding means is further adapted to find the feature, and
   wherein the means is further adapted to measure the aspect of the feature to provide the measured value.

17. The apparatus of claim 13, wherein process means is further adapted to process a plurality of images using the scale relationship, the apparatus further comprising:
   a plurality of objects; and
   acquiring means, in cooperation with the imaging system, adapted to acquire the plurality of images of the plurality of objects, respectively.

18. The apparatus of claim 13, wherein the characteristic is a fiducial.

19. The apparatus of claim 13, wherein the characteristic is a relationship between features of the object.

20. The apparatus of claim 19, wherein the features are dots within a grid of dots.

21. A method for calculating a scale relationship for an imaging system, the method comprising:
   (a) selecting a characteristic having an aspect with a known value, the characteristic associated with an object;
   (b) acquiring, using the imaging system, an image of at least a portion of the characteristic of the object;
   (c) finding the characteristic in the image and measuring the aspect of the characteristic in the image to provide a measured value;
   (d) calculating the scale relationship for the imaging system, using the measured value and the known value; and
   (e) inspecting the object in the image using the scale relationship.

22. The method of claim 21, wherein the object is an end-face of a fiber-optic cable, and wherein inspecting further includes:
   finding potential defects in the image of the end-face;
   measuring the potential defects in the image of the end-face; and
   calculating a physical size of the potential defects using the scale relationship.

23. The method of claim 22, wherein selecting the characteristic further includes:
   selecting, as the characteristic, a diameter of an annular cladding of the end-face of the fiber-optic cable.

24. The method of claim 23, wherein finding the characteristic in the image and measuring further includes:
   generating at east one model of the annular cladding of the end-face of the fiber-optic cable;
   finding in the image a best match to the at least one model; and
   measuring the diameter of the best match to provide the measured value.

25. The method of claim 24, wherein generating the at least one model, further includes:
   generating, as the at least one model, at least one scale-invariant model.

26. The method of claim 22, wherein selecting the characteristic further includes:
   selecting, as the characteristic, a diameter of a stress rod of the end-face of the fiber-optic cable.

27. The method of claim 21, wherein the characteristic associated with the object is associated with each object of a plurality of the objects, the method further comprising;
   (f) repeating (b)–(e) with each of the plurality of objects.

28. An apparatus for calculating a scale relationship for an imaging system, the apparatus comprising:

a characteristic having an aspect with a known value, characteristic associated with an object;

an image, acquired by the imaging system, of at least a portion of the characteristic of the object, finding means, adapted to find the characteristic in the image;

measuring means, in cooperation with the finding means, adapted to measure the aspect of the characteristic in the image to provide a measured value;

scale means, in cooperation with the measuring means, adapted to calculate a scale relationship between the image and the object, using the measured value and the known value; and inspecting means, in cooperation with the scale means, adapted to inspect the object in the image using the scale relationship.

29. The apparatus of claim 28, wherein the object is an end-face of a fiber-optic cable, and wherein inspecting means further includes:

defect means, adapted to find potential defects in the image of the end-face;

defect-measuring means, in cooperation with the defect means, adapted to measure the potential defects in the image of the end-face; and size means, in cooperation with the defect-measuring means and the scale means, adapted to calculate a physical size of the potential defects using the scale relationship.

30. The apparatus of claim 29, wherein the characteristic is a diameter of an annular cladding of the end-face of the fiber-optic cable.

31. The apparatus of claim 30, wherein the finding means further includes:

modeling means, adapted to generate at last one model of the annular cladding;

searching means, in cooperation with the modeling means, adapted to search the image to find a best match to the at least one model; and wherein the measuring means is further adapted to measure the diameter of the best match to provide the measured value.

32. The apparatus of claim 31, wherein the modeling means is further adapted to generate at least one scale-invariant model.

33. The method of claim 29, wherein the characteristic is a diameter of a stress rod of the end-face of the fiber-optic cable.

34. The apparatus of claim 28, further comprising:

a plurality of objects, each object of the plurality of objects associated with the characteristic; and the plurality of images acquired by the imaging system, of at least a portion of the characteristic for each object of the plurality of objects, and wherein the finding means is fiber adapted to find the characteristic in each of the plurality of images, wherein the measuring mean is further adapted to measure within each of the plurality of images, the characteristic, so as to provide a plurality of measured vales, wherein the scale means is further adapted to calculate a scale relationship between each of the plurality of objects and each of the plurality of images using the known value and the respective measured value of the plurality of measured values, so as to provide the plurality of scale relationships, and wherein the inspection means is further adapted to inspect each of the plurality of images using the respective scale relationship of the plurality of scale relationships.

35. A method for calculating a scale relationship for an imaging system, the method comprising:

selecting a characteristic having a known value, the characteristic associated with each object of a plurality of objects;

acquiring, with the imaging system, an image of at least a portion of the characteristic for each object of the plurality of objects, so as to provide a plurality of images;

finding the characteristic in each of the plurality of images;

measuring, within each of the plurality of images, the characteristic, so as to provide a plurality of measured values;

calculating a scale relationship between each of the plurality of objects and each of the plurality of images using the known value and the respective measured value of the plurality of measured values, so as to provide the plurality of scale relationships; and processing each of the plurality of images using the respective scale relationship of the plurality of scale relationships.

36. The method of claim 35, wherein finding the characteristic in the image further includes:

generating at least one model of at least part of the object, the model including the characteristic; and searching the image to find a best match to the at least one model, and wherein measuring the characteristic further includes:

measuring the characteristic of the best match to provide the value.

37. The method of claim 35, wherein the object is a fiber-optic end-face, and selecting the characteristic further includes:

selecting, as the characteristic, a diameter of a substantially annular cladding of the fiber-optic end-face.

38. The method of claim 35, wherein processing image further includes:

inspecting the image using the respective scale relationship.

39. The method of claim 38, further comprising:

(f) repeating (b)–(e) with each of the plurality of objects.

40. A method for, at least partially, calibrating an imaging system, the method comprising:

(a) selecting a characteristic having a known value, the characteristic associated with each of a plurality of objects;

(b) acquiring, using the imaging system, image of at least a portion of the characteristic of one object of the plurality of objects;

(c) finding the characteristic in the image and measuring the characteristic in the image to provide a measured value;

(d) calibrating, at least partially, the imaging system by calculating a scale relationship between the image and the object, using the measured value and the known value; and (e) processing the image using the scale relationship.

* * * * *